(12) United States Patent
Sharifi et al.

(10) Patent No.: US 10,387,461 B2
(45) Date of Patent: Aug. 20, 2019

(54) TECHNIQUES FOR SUGGESTING ELECTRONIC MESSAGES BASED ON USER ACTIVITY AND OTHER CONTEXT

(71) Applicant: Google LLC, Mountain View, CA (US)

(72) Inventors: Matthew Sharifi, Kilchberg (CH); Jakob Nicolaus Foerster, Zurich (CH)

(73) Assignee: Google LLC, Mountain View, CA (US)

( * ) Notice: Subject to any disclaimer, the term of this patent is extended or adjusted under 35 U.S.C. 154(b) by 189 days.

(21) Appl. No.: 15/238,304

(22) Filed: Aug. 16, 2016

(65) Prior Publication Data

US 2018/0052909 A1    Feb. 22, 2018

(51) Int. Cl.
*G06F 16/332* (2019.01)
*H04L 12/58* (2006.01)
*G06Q 10/10* (2012.01)

(52) U.S. Cl.
CPC ....... *G06F 16/3326* (2019.01); *G06Q 10/107* (2013.01); *H04L 51/22* (2013.01)

(58) Field of Classification Search
CPC .......... G06F 17/24; G06F 17/27; G06F 17/30; G06F 17/243; G06F 17/276; G06F 17/3056; G06F 17/3087; G06F 17/30976; H04W 4/12; H04W 4/14; H04L 51/02; H04L 51/20; H04L 51/16; H04L 67/306
See application file for complete search history.

(56) References Cited

U.S. PATENT DOCUMENTS

| 6,092,102 | A | 7/2000 | Wagner |
| 7,603,413 | B1 | 10/2009 | Herold et al. |
| 8,391,618 | B1 | 3/2013 | Chuang et al. |
| 8,423,577 | B1 | 4/2013 | Lee et al. |
| 8,515,958 | B2 | 8/2013 | Knight |
| 8,554,701 | B1 | 10/2013 | Dillard et al. |

(Continued)

FOREIGN PATENT DOCUMENTS

| CN | 1475908 | 2/2004 |
| CN | 102222079 | 10/2011 |

(Continued)

OTHER PUBLICATIONS

PCT International Search Report and Written Opinion dated Oct. 11, 2017 for PCT Application No. PCT/US2017/046858, 10 pages.

(Continued)

*Primary Examiner* — Aftab N. Khan
(74) *Attorney, Agent, or Firm* — IP Spring (57) ABSTRACT

A computer-implemented technique can include detecting an initiation of composing an electronic message by a user, obtaining contextual information for the electronic message from a source external to a text of the electronic message, obtaining a first suggestion for the text of the electronic message based on the contextual information, detecting an operating condition indicative of a user activity during which the user is likely to experience difficulty in typing, in response to detecting the operating condition, obtaining a second suggestion for the electronic message based on the contextual information, the second suggestion being more detailed than the first suggestion, and outputting one of the first and second suggestions depending on one or more other conditions.

26 Claims, 3 Drawing Sheets

(56) References Cited

U.S. PATENT DOCUMENTS

| | | | |
|---|---|---|---|
| 8,589,407 B2* | 11/2013 | Bhatia | G06F 17/30528 707/748 |
| 8,650,210 B1* | 2/2014 | Cheng | G06F 17/30864 707/770 |
| 8,688,698 B1 | 4/2014 | Black et al. | |
| 8,700,480 B1 | 4/2014 | Fox et al. | |
| 8,825,474 B1 | 9/2014 | Zhai et al. | |
| 8,938,669 B1 | 1/2015 | Cohen | |
| 8,996,639 B1 | 3/2015 | Faaborg et al. | |
| 9,191,786 B2 | 11/2015 | Davis | |
| 9,213,941 B2 | 12/2015 | Petersen | |
| 9,230,241 B1 | 1/2016 | Singh et al. | |
| 9,262,517 B2 | 2/2016 | Feng et al. | |
| 9,560,152 B1 | 1/2017 | Jamdar et al. | |
| 9,674,120 B2 | 6/2017 | Davis | |
| 9,715,496 B1 | 7/2017 | Sapoznik et al. | |
| 9,805,371 B1 | 10/2017 | Sapoznik et al. | |
| 9,807,037 B1 | 10/2017 | Sapoznik et al. | |
| 9,817,813 B2 | 11/2017 | Faizakof et al. | |
| 10,146,748 B1 | 12/2018 | Barndollar et al. | |
| 2003/0105589 A1 | 6/2003 | Liu et al. | |
| 2006/0029106 A1 | 2/2006 | Ott et al. | |
| 2006/0156209 A1 | 7/2006 | Matsuura et al. | |
| 2007/0030364 A1 | 2/2007 | Obrador et al. | |
| 2007/0094217 A1 | 4/2007 | Ronnewinkel | |
| 2007/0162942 A1 | 7/2007 | Hamynen et al. | |
| 2007/0244980 A1 | 10/2007 | Baker et al. | |
| 2009/0076795 A1 | 3/2009 | Bangalore et al. | |
| 2009/0119584 A1 | 5/2009 | Herbst | |
| 2009/0282114 A1 | 11/2009 | Feng et al. | |
| 2010/0228590 A1* | 9/2010 | Muller | G06Q 10/10 705/319 |
| 2010/0260426 A1 | 10/2010 | Huang et al. | |
| 2011/0074685 A1 | 3/2011 | Causey et al. | |
| 2011/0107223 A1 | 5/2011 | Tilton et al. | |
| 2011/0164163 A1 | 7/2011 | Bilbrey et al. | |
| 2011/0252108 A1 | 10/2011 | Morris et al. | |
| 2012/0033876 A1 | 2/2012 | Momeyer et al. | |
| 2012/0041941 A1 | 2/2012 | King et al. | |
| 2012/0041973 A1 | 2/2012 | Kim et al. | |
| 2012/0042036 A1 | 2/2012 | Lau et al. | |
| 2012/0131520 A1 | 5/2012 | Tang et al. | |
| 2012/0179717 A1 | 7/2012 | Kennedy et al. | |
| 2012/0224743 A1 | 9/2012 | Rodriguez et al. | |
| 2012/0245944 A1 | 9/2012 | Gruber et al. | |
| 2013/0050507 A1 | 2/2013 | Syed et al. | |
| 2013/0061148 A1 | 3/2013 | Das et al. | |
| 2013/0073366 A1 | 3/2013 | Heath | |
| 2013/0260727 A1 | 10/2013 | Knudson et al. | |
| 2013/0262574 A1 | 10/2013 | Cohen | |
| 2013/0346235 A1 | 12/2013 | Lam | |
| 2014/0004889 A1* | 1/2014 | Davis | H04W 4/12 455/466 |
| 2014/0035846 A1 | 2/2014 | Lee et al. | |
| 2014/0047413 A1 | 2/2014 | Sheive et al. | |
| 2014/0067371 A1 | 3/2014 | Liensberger | |
| 2014/0088954 A1 | 3/2014 | Shirzadi et al. | |
| 2014/0108562 A1 | 4/2014 | Panzer | |
| 2014/0163954 A1 | 6/2014 | Joshi et al. | |
| 2014/0164506 A1 | 6/2014 | Tesch et al. | |
| 2014/0171133 A1* | 6/2014 | Stuttle | G06F 17/3087 455/466 |
| 2014/0189027 A1 | 7/2014 | Zhang et al. | |
| 2014/0189538 A1 | 7/2014 | Martens et al. | |
| 2014/0201675 A1 | 7/2014 | Joo et al. | |
| 2014/0228009 A1* | 8/2014 | Chen | H04W 4/12 455/414.1 |
| 2014/0237057 A1 | 8/2014 | Khodorenko | |
| 2014/0317030 A1 | 10/2014 | Shen et al. | |
| 2014/0337438 A1 | 11/2014 | Govande et al. | |
| 2014/0372349 A1 | 12/2014 | Driscoll | |
| 2015/0006143 A1 | 1/2015 | Skiba et al. | |
| 2015/0032724 A1 | 1/2015 | Thirugnanasundaram et al. | |
| 2015/0058720 A1 | 2/2015 | Smadja et al. | |
| 2015/0095855 A1 | 4/2015 | Bai et al. | |
| 2015/0100537 A1 | 4/2015 | Grieves et al. | |
| 2015/0178371 A1 | 6/2015 | Seth et al. | |
| 2015/0178388 A1 | 6/2015 | Winnemoeller et al. | |
| 2015/0207765 A1 | 7/2015 | Brantingham et al. | |
| 2015/0227797 A1 | 8/2015 | Ko et al. | |
| 2015/0248411 A1 | 9/2015 | Krinker et al. | |
| 2015/0250936 A1 | 9/2015 | Thomas et al. | |
| 2015/0286371 A1 | 10/2015 | Degani | |
| 2015/0302301 A1 | 10/2015 | Petersen | |
| 2016/0037311 A1 | 2/2016 | Cho | |
| 2016/0042252 A1 | 2/2016 | Sawhney et al. | |
| 2016/0043974 A1 | 2/2016 | Purcell et al. | |
| 2016/0072737 A1 | 3/2016 | Forster | |
| 2016/0140447 A1 | 5/2016 | Cohen et al. | |
| 2016/0140477 A1 | 5/2016 | Karanam et al. | |
| 2016/0162791 A1 | 6/2016 | Petersen | |
| 2016/0179816 A1 | 6/2016 | Glover | |
| 2016/0210279 A1 | 7/2016 | Kim et al. | |
| 2016/0224524 A1* | 8/2016 | Kay | G06F 17/276 |
| 2016/0226804 A1 | 8/2016 | Hampson et al. | |
| 2016/0234553 A1 | 8/2016 | Hampson et al. | |
| 2016/0283454 A1 | 9/2016 | Leydon et al. | |
| 2016/0342895 A1 | 11/2016 | Gao et al. | |
| 2016/0350304 A1 | 12/2016 | Aggarwal et al. | |
| 2016/0378080 A1 | 12/2016 | Uppala et al. | |
| 2017/0075878 A1 | 3/2017 | Jon et al. | |
| 2017/0093769 A1 | 3/2017 | Lind et al. | |
| 2017/0098122 A1 | 4/2017 | el Kaliouby et al. | |
| 2017/0134316 A1 | 5/2017 | Cohen et al. | |
| 2017/0142046 A1 | 5/2017 | Mahmoud et al. | |
| 2017/0149703 A1 | 5/2017 | Willett et al. | |
| 2017/0153792 A1 | 6/2017 | Kapoor et al. | |
| 2017/0171117 A1 | 6/2017 | Carr et al. | |
| 2017/0180276 A1 | 6/2017 | Gershony et al. | |
| 2017/0180294 A1 | 6/2017 | Milligan et al. | |
| 2017/0187654 A1 | 6/2017 | Lee | |
| 2017/0250930 A1 | 8/2017 | Ben-Itzhak | |
| 2017/0250935 A1 | 8/2017 | Rosenberg | |
| 2017/0250936 A1 | 8/2017 | Rosenberg et al. | |
| 2017/0293834 A1 | 10/2017 | Raison et al. | |
| 2017/0308589 A1 | 10/2017 | Liu et al. | |
| 2017/0324868 A1 | 11/2017 | Tamblyn et al. | |
| 2017/0344224 A1 | 11/2017 | Kay et al. | |
| 2017/0357442 A1 | 12/2017 | Peterson et al. | |
| 2018/0004397 A1 | 1/2018 | Mazzocchi | |
| 2018/0005272 A1 | 1/2018 | Todasco et al. | |
| 2018/0012231 A1 | 1/2018 | Sapoznik et al. | |
| 2018/0013699 A1 | 1/2018 | Sapoznik et al. | |
| 2018/0060705 A1 | 3/2018 | Mahmoud et al. | |
| 2018/0083898 A1 | 3/2018 | Pham | |
| 2018/0083901 A1 | 3/2018 | McGregor et al. | |
| 2018/0090135 A1 | 3/2018 | Schlesinger et al. | |
| 2018/0137097 A1 | 5/2018 | Lim et al. | |
| 2018/0196854 A1 | 7/2018 | Burks | |
| 2018/0210874 A1 | 7/2018 | Fuxman et al. | |
| 2018/0293601 A1 | 10/2018 | Glazier | |
| 2018/0309706 A1 | 10/2018 | Kim et al. | |
| 2018/0316637 A1 | 11/2018 | Desjardins | |
| 2018/0336226 A1 | 11/2018 | Anorga et al. | |
| 2018/0336415 A1 | 11/2018 | Anorga et al. | |
| 2018/0373683 A1 | 12/2018 | Hullette et al. | |

FOREIGN PATENT DOCUMENTS

| | | |
|---|---|---|
| CN | 102395966 | 3/2012 |
| CN | 102467574 | 5/2012 |
| CN | 103548025 | 1/2014 |
| EP | 1376392 | 1/2004 |
| EP | 1394713 | 3/2004 |
| EP | 2523436 | 11/2012 |
| EP | 2560104 | 2/2013 |
| EP | 2688014 | 1/2014 |
| EP | 2703980 | 3/2014 |
| EP | 3091445 | 11/2016 |
| KR | 20110003462 | 1/2011 |
| KR | 20130008036 | 1/2013 |
| KR | 20130061387 | 6/2013 |
| WO | 2004/104758 | 12/2004 |

(56) References Cited

FOREIGN PATENT DOCUMENTS

| WO | 2011/002989 | 1/2011 |
|---|---|---|
| WO | 2016130788 | 8/2016 |
| WO | 2018089109 | 5/2018 |

OTHER PUBLICATIONS

USPTO, Notice of Allowance for U.S. Appl. No. 15/624,638, dated Feb. 28, 2019, 21 Pages.
EPO, Written Opinion of the International Preliminary Examination Authority for International Patent Application No. PCT/US2017/057044, dated Dec. 20, 2018, 8 pages.
EPO, Written Opinion for International Patent Application No. PCT/US2017/057044, dated Jan. 18, 2018, 8 pages.
EPO, Written Opinion of the International Preliminary Examining Authority for International Patent Application No. PCT/US2017/052349, dated Aug. 6, 2018, 9 pages.
EPO, Written Opinion for International Patent Application No. PCT/US2016/068083, dated Mar. 9, 2017, 9 pages.
Fuxman, ""Aw, so cute!": Allo helps you respond to shared photos", Google Research Blog, https://research.googleblog.com/2016/05/aw-so-cute-allo-helps-you-respond-to.html, May 18, 2016, 6 pages.
International Bureau of WIPO, International Preliminary Report on Patentability for International Patent Application No. PCT/US2016/068083, dated Jul. 5, 2018, 9 pages.
Kannan, et al., "Smart Reply: Automated Response Suggestions for Email", Proceedings of the 22nd ACM SIGKDD International Conference on Knowledge Discovery and Data Mining, KDD '16, ACM Press, New York, New York, Aug. 13, 2016, pp. 955-965.
Khandelwal, "Hey Allo! Meet Google's AI-powered Smart Messaging App", The Hacker News, http://web.archive.org/web/20160522155700/https://thehackernews.com/2016/05/google-allo-messenger.html, May 19, 2016, 3 pages.
KIPO, Preliminary Rejection for Korean Patent Application No. 10-2018-7013953, dated Oct. 29, 2018, 5 pages.
Lee, et al., "Supporting multi-user, multi-applet workspaces in CBE", Proceedings of the 1996 ACM conference on Computer supported cooperative work, ACM, Nov. 16, 1996, 10 pages.
Microsoft Corporation, "Windows Messenger for Windows XP", Retrieved from Internet: http://web.archive.org/web/20030606220012/messenger.msn.com/support/features.asp?client=0 on Sep. 22, 2005, Jun. 6, 2003, 3 pages.
EPO, International Search Report and Written Opinion for International Application No. PCT/US2018/021028, dated Jun. 15, 2018, 11 pages.
Pinterest, "Pinterest Lens", www.help.pinterest.com/en/articles/pinterest-lens, 2 pages.
Russell, "Google Allo is the Hangouts Killer We've Been Waiting For", Retrieved from the Internet: http://web.archive.org/web/20160519115534/https://www.technobuffalo.com/2016/05/18/google-allo-hangouts-replacement/, May 18, 2016, 3 pages.
USPTO, Notice of Allowance for U.S. Appl. No. 15/709,418, dated Mar. 1, 2018, 11 pages.
USPTO, Non-final Office Action for U.S. Appl. No. 15/386,162, dated Nov. 27, 2018, 12 pages.
USPTO, Notice of Allowance for U.S. Appl. No. 14/618,962, dated Nov. 8, 2016, 14 pages.
USPTO, Non-final Office Action for U.S. Appl. No. 15/709,418, dated Nov. 21, 2017, 15 pages.
USPTO, First Action Interview, Office Action Summary for U.S. Appl. No. 16/003,661, dated Dec. 14, 2018, 16 pages.
USPTO, Notice of Allowance for U.S. Appl. No. 15/428,821, dated Jan. 10, 2018, 20 pages.
USPTO, Non-final Office Action for U.S. Appl. No. 14/618,962, dated Feb. 26, 2016, 25 pages.
USPTO, Notice of Allowance for U.S. Appl. No. 15/415,506, dated Jul. 23, 2018, 25 pages.
USPTO, Non-final Office Action for U.S. Appl. No. 15/428,821, dated May 18, 2017, 30 pages.
USPTO, First Action Interview, Pre-Interview Communication for U.S. Appl. No. 15/624,637, dated Oct. 19, 2018, 4 pages.
USPTO, First Action Interview, Office Action Summary for U.S. Appl. No. 15/350,040, dated Oct. 30, 2018, 4 pages.
USPTO, Non-final Office Action for U.S. Appl. No. 15/946,342, dated Jul. 26, 2018, 40 pages.
USPTO, First Action Interview, Pre-Interview Communication for U.S. Appl. No. 15/415,506, dated Apr. 5, 2018, 5 pages.
USPTO, First Action Interview, Office Action Summary for U.S. Appl. No. 15/624,637, dated Jan. 25, 2019, 5 pages.
USPTO, First Action Interview, Pre-Interview Communication for U.S. Appl. No. 15/350,040, dated Jul. 16, 2018, 5 pages.
USPTO, First Action Interview, Pre-Interview Communication for U.S. Appl. No. 15/386,760, dated Nov. 6, 2018, 5 pages.
USPTO, First Action Interview, Pre-Interview Communication for U.S. Appl. No. 16/003,661, dated Aug. 29, 2018, 6 pages.
USPTO, First Action Interview, Office Action Summary for U.S. Appl. No. 15/386,760, dated Jan. 30, 2019, 8 pages.
Vinyals, et al., "Show and Tell: A Neural Image Caption Generator", arXiv:1411.4555v2 [cs.CV], Apr. 20, 2015, pp. 1-9.
Yeh, et al., "Searching the web with mobile images for location recognition", Proceedings of the 2004 IEEE Computer Society Conference on Pattern Recognition, vol. 2, Jun.-Jul. 2004, pp. 1-6.
Australia IP, Notice of Acceptance for Australian Patent Application No. 2015214298, dated Apr. 20, 2018, 3 pages.
Australia IP, Examination Report No. 1 for Australian Patent Application No. 2015214298, dated Apr. 24, 2017, 3 pages.
Australia IP, Examination Report No. 2 for Australian Patent Application No. 2015214298, dated Nov. 2, 2017, 3 pages.
USPTO, International Search Report and Written Opinion for International Patent Application No. PCT/US2015/014414, dated May 11, 2015, 8 pages.
Blippar, "Computer Vision API", www.web.blippar.com/computer-vision-api, 2018, 4 pages.
Chen, et al., "Bezel Copy: An Efficient Cross-0Application Copy-Paste Technique for Touchscreen Smartphones.", Advanced Visual Interfaces, ACM, New York, New York, May 27, 2014, pp. 185-192.
CNIPA, First Office Action for Chinese Patent Application No. 201580016692.1, dated Nov. 2, 2018, 7 pages.
EPO, International Search Report and Written Opinion for International Patent Application No. PCT/US2016/068083, dated Mar. 9, 2017, 13 pages.
EPO, International Search Report for International Patent Application No. PCT/US2017/052713, dated Dec. 5, 2017, 4 Pages.
EPO, International Search Report for International Patent Application No. PCT/US2016/068083, dated Mar. 9, 2017, 4 pages.
EPO, International Search Report for International Patent Application No. PCT/US2018/022501, dated May 14, 2018, 4 pages.
EPO, International Search Report for International Patent Application No. PCT/US2017/052349, dated Dec. 13, 2017, 5 pages.
EPO, International Search Report for International Patent Application No. PCT/US2017/057044, dated Jan. 18, 2018, 5 pages.
EPO, Written Opinion for International Patent Application No. PCT/US2017/052713, dated Dec. 5, 2017, 6 pages.
EPO, International Search Report for International Patent Application No. PCT/US2018/022503, dated Aug. 16, 2018, 6 pages.
EPO, Written Opinion for International Patent Application No. PCT/US2017/052349, dated Dec. 13, 2017, 6 pages.
EPO, Written Opinion for International Patent Application No. PCT/US2018/022501, dated May 14, 2018, 6 pages.
EPO, Written Opinion of the International Preliminary Examining Authority for International Patent Application No. PCT/US2017/052713, dated Oct. 15, 2018, 6 pages.
EPO, Extended European Search Report for European Patent Application No. 15746410.8, dated Sep. 5, 2017, 7 pages.
EPO, Written Opinion for International Patent Application No. PCT/US2018/022503, dated Aug. 16, 2018, 8 pages.
EPO, Communication Pursuant to Article 94(3) EPC for European Patent Application No. 16825663.4, Apr. 16, 2019, 5 pages.
EPO, Communication Pursuant to Article 94(3) EPC for European Patent Application No. 1682566.7, Apr. 23, 2019, 6 pages.
KIPO, Notice of Final Rejection for Korean Patent Application No. 10-2018-7013953, dated Jun. 13, 2019, 4 pages.

(56) References Cited

OTHER PUBLICATIONS

KIPO, Notice of Preliminary Rejection for Korean Patent Application No. 10-2018-7019756, dated May 13, 2019, 9 pages.
KIPO, Notice of Preliminary Rejection for Korean Patent Application No. 10-2019-7011687, dated May 7, 2019, 3 pages.
KIPO, Notice of Final Rejection for Korean Patent Application No. 10-2018-7013953, dated May 8, 2019, 4 pages.
USPTO, Notice of Allowance for U.S. Appl. No. 15/624,637, dated Apr. 19, 2019, 6 pages.
USPTO, Notice of Allowance for U.S. Appl. No. 15/350,040, dated Apr. 24, 2019, 16 pages.
USPTO, Final Office Action for U.S. Appl. No. 15/386,162, dated Jun. 5, 2019, 13 pages.
USPTO, Notice of Allowance for U.S. Appl. No. 16/003,661, dated May 1, 2019, 11 pages.
USPTO, Non-final Office Action for U.S. Appl. No. 15/709,423, dated May 2, 2019, 21 Pages.
USPTO, Final Office Action for U.S. Appl. No. 15/386,760, dated May 30, 2019, 13 pages.

\* cited by examiner

TECHNIQUES FOR SUGGESTING ELECTRONIC MESSAGES BASED ON USER ACTIVITY AND OTHER CONTEXT

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Electronic messaging, such as text messaging and emailing, has become one of the primary methods by which people communicate. There are times, however, when it can be difficult for a user to type an electronic message using a keyboard. Conventional systems can suggest one or more of a few pre-generated messages, such as in response to a shorthand input ("brt" can result in the suggestion "be right there," "omw" can result in the suggestion "on my way," etc.). These pre-generated messages, however, are generic and lack any specific context, such as a context of the user's current activity.

SUMMARY

According to one aspect of the present disclosure, a computer-implemented method is presented. The method can include detecting, by a computing device having one or more processors, an initiation of composing an electronic message by a user; obtaining, by the computing device, contextual information for the electronic message from a source external to a text of the electronic message; obtaining, by the computing device, a first suggestion for the text of the electronic message based on the contextual information; detecting, by the computing device, an operating condition indicative of a user activity during which the user is likely to experience difficulty in typing; in response to detecting the operating condition, obtaining, by the computing device, a second suggestion for the electronic message based on the contextual information, the second suggestion being more detailed than the first suggestion; and outputting, by the computing device, one of the first and second suggestions depending on one or more other conditions.

In some implementations, the detecting of the operating condition is based on a measured gravitational force. In some implementations, the user activity is walking or running, and the measured gravitational force indicates that the user is walking or running. In some implementations, the user activity is waiting in a line, and the measured gravitational force indicates that the user is waiting in a line.

In some implementations, the one or more other conditions include the user arriving at a known location, the outputting includes outputting the second suggestion, and the second suggestion relates to the arrival at the known location. In some implementations, (i) the first suggestion is a word and the second suggestion is a phrase or a sentence or (ii) the first suggestion is the word or the phrase and the second suggestion is the sentence.

In some implementations, the contextual information includes previous electronic messages associated with the user. In some implementations, the contextual information includes a date/time stamp for a particular previous electronic message comprising a question to the user.

In some implementations, the contextual information includes calendar information for the user. In some implementations, the calendar information includes at least one of (i) a type of an activity the user is currently engaged in and (ii) at least one of a start time and an end time of the activity that the user is currently engaged in.

In some implementations, the computing device is a client computing device associated with the user. In some implementations, the computing device is a server computing device that is distinct from a client computing device associated with the user.

According to another aspect of the present disclosure, a computing device is presented. The computing device can include a non-transitory computer-readable medium having a set of instructions stored thereon and one or more processors configured to execute the set of instructions, which causes the one or more processors to perform operations. The operations can include detecting an initiation of composing an electronic message by a user; obtaining contextual information for the electronic message from a source external to a text of the electronic message; obtaining a first suggestion for the text of the electronic message based on the contextual information; detecting an operating condition indicative of a user activity during which the user is likely to experience difficulty in typing; in response to detecting the operating condition, obtaining a second suggestion for the electronic message based on the contextual information, the second suggestion being more detailed than the first suggestion; and outputting one of the first and second suggestions depending on one or more other conditions.

In some implementations, the detecting of the operating condition is based on a measured gravitational force. In some implementations, the user activity is walking or running, and the measured gravitational force indicates that the user is walking or running. In some implementations, the user activity is waiting in a line, and the measured gravitational force indicates that the user is waiting in a line.

In some implementations, the one or more other conditions include the user arriving at a known location, the outputting includes outputting the second suggestion, and the second suggestion relates to the arrival at the known location. In some implementations, (i) the first suggestion is a word and the second suggestion is a phrase or a sentence or (ii) the first suggestion is the word or the phrase and the second suggestion is the sentence.

In some implementations, the contextual information includes previous electronic messages associated with the user. In some implementations, the contextual information includes a date/time stamp for a particular previous electronic message comprising a question to the user.

In some implementations, the contextual information includes calendar information for the user. In some implementations, the calendar information includes at least one of (i) a type of an activity the user is currently engaged in and (ii) at least one of a start time and an end time of the activity that the user is currently engaged in.

In some implementations, the second suggestion is obtained in response to the user inputting a prefix of the electronic message. In some implementations, the computing device is a client computing device associated with the user. In some implementations, the computing device is a server computing device that is distinct from a client computing device associated with the user.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As mentioned above, typical pre-generated suggestions for electronic messaging lack any specific context, such as a context of a user's current activity. Some systems may derive a context of the electronic message from one or more previous words, but this still fails to capture any context outside of those one or more words. Such systems also do not work when the user has yet to input any words. Accordingly, improved techniques for suggesting electronic messages based on user activity and other context are presented. These techniques can leverage other sources of information to determine context for the electronic message and thereby provide more detailed suggestions. Such sources of information can be referred to as "external sources" that indicate any context of a particular electronic message that is not derived from its text.

Non-limiting examples of these external sources include user calendar information, other electronic messages, past and/or present user location information, and accelerometer information. In some implementations, an operating condition can be detected that is indicative of a user activity during which the user is likely to experience difficulty typing at their client computing device. This operating condition could be detected, for example, when a gravitational force ("g-force") being experienced by the client computing device exceeds a threshold (e.g., indicative of the user walking or running). When such an operating condition is detected, a more detailed suggestion could be provided based on the obtained contextual information. Instead of suggesting just a few words, such as "On my way," a full sentence could be suggested, such as "I'm jogging down Main Street and should be there in 10 minutes."

The techniques of the present disclosure could be at least partially implemented by an electronic messaging application executing at a client computing device. This electronic messaging application could be, for example only, a stand-alone electronic messaging application. Non-limiting example user interfaces are discussed herein and illustrated in FIGS. 4A-4C. Additionally or alternatively, these techniques could be at least partially implemented at an operating system level at the client computing device. Further, at least a portion of these techniques could be implemented at a server computing device. The server computing device could, for example, provide a response to a request from the client computing device.

The present disclosure is directed to, inter alia, the technical problem of interpreting and classifying user input in a messaging application. More specifically, the present disclosure is directed to techniques for providing appropriate suggested messages in a messaging application based on the external context of the user and her/his associated client computing device. The techniques utilize various hardware components and other forms of previously input information to analyze the external context of the messaging application. Based on the external context, and when the user initiates the composition of a message, the techniques provide for determining and outputting one or more fully formed output suggestions that are appropriate for the external context of the message (e.g., the context of the message independent of its previously input text).

Figure 1:
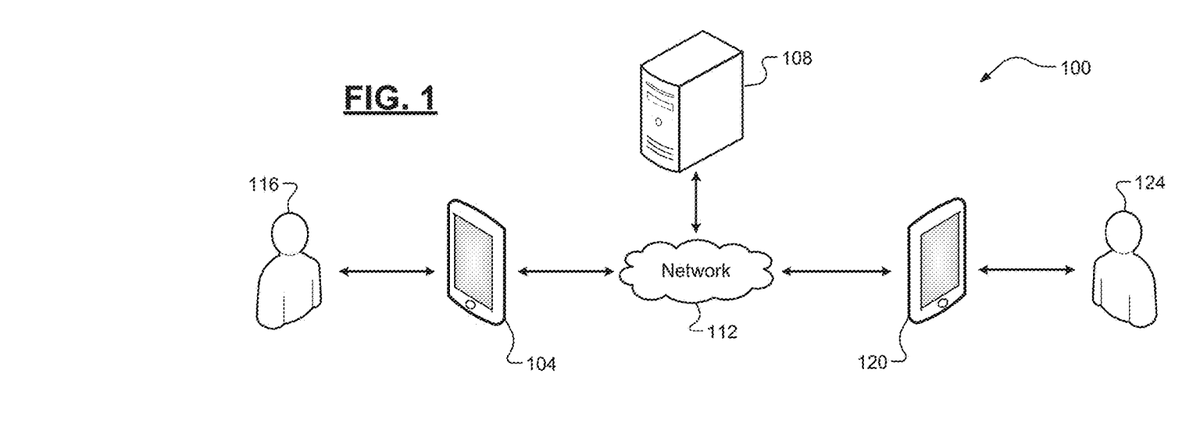
FIG. 1 is a diagram of an example computing system according to some implementations of the present disclosure.

Referring now to FIG. 1, an example computing system 100 according to some implementations of the present disclosure is illustrated. The computing system 100 can include a client computing device 104 that can communicate with a remote server computing device 108 via a network 112. The network 112 can be a local area network (LAN), a wide area network (WAN), e.g., the Internet, or a combination thereof. While the client computing device 104 is shown to be a mobile phone, it will be appreciated that the client computing device 104 can be any suitable mobile computing device (a tablet computer, a laptop computer, etc.). The server computing device 108 can be any suitable hardware server or plurality of hardware servers operating in a parallel or distributed architecture. A first user 116 can operate the client computing device 104, such as to exchange electronic messages (text messages, emails, etc.) via the network 112 with another computing device 120 associated with a second user 124.

Figure 2:
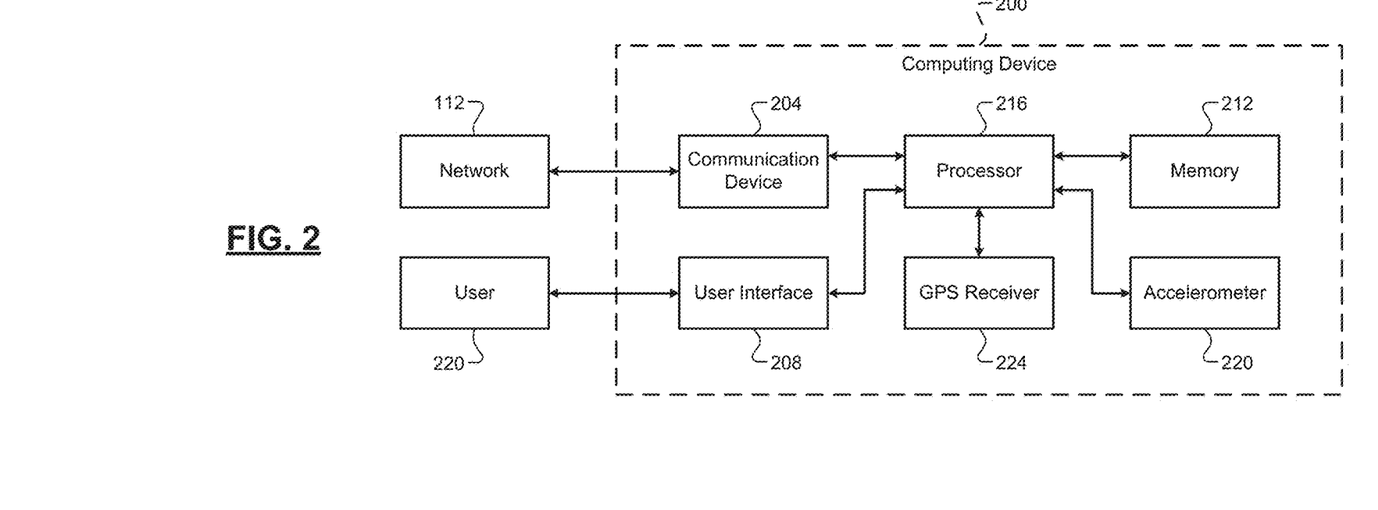
FIG. 2 is a functional block diagram of an example computing device according to some implementations of the present disclosure.

Referring now to FIG. 2, an example computing device 200 is illustrated. The client computing device 104, the server computing device 108, and the other computing device 120 can each have the same or similar configuration as the example computing device 200. The computing device 200 can include a communication device 204 (e.g., a transceiver) configured for communication via the network 112. The computing device 200 can include a user interface 208 (e.g., a touch display) configured to receive input and/or output information from/to a user 220 (e.g., user 116 or user 124). The computing device 200 can include a non-transitory computer-readable medium or memory 212 (flash, hard disk, etc.) configured to store information at the computing device 200. The computing device 200 can also include a processor 216 configured to control operation of the computing device 200.

The term "processor" as used herein can refer to both a single processor and a plurality of processors operating in a parallel or distributed architecture. In one implementation, the memory 212 may store a set of instructions that, when executed by the processor 216, causes the computing device 200 to perform at least a portion of the techniques of the present disclosure. The computing device 200 can also include other systems, such as an accelerometer 220 and a global positioning satellite (GPS) receiver 224. The accelerometer 220 can be any suitable accelerometer or system of accelerometers configured to measure a gravitational force ("g-force") experienced by the computing device 200. The GPS receiver 224 can communicate with a GPS system (not shown) to obtain global position data (e.g., location information) for the computing device 200. The use of the accelerometer 220 and GPS receiver 224 will be discussed in more detail below.

According to one aspect of the present disclosure, the computing system 100 can determine suggestion(s) for a text of an electronic message being composed by the first user 116 of the client computing device 104. These techniques can be initiated, for example, upon the initiation of composing the electronic message (e.g., selecting or clicking a text entry box or an input field of a messaging application). After the composing of the electronic message is initiated, the computing system 100 can determine context information from a source external to the text of the electronic message. This "external context" refers to any information other than the actual text of the electronic message (e.g., previous characters or words). One example of this external context information is previous messages associated with the first user 116. For example, if the first user 116 is addressing the electronic message to the second user 124, previous electronic messages between the two could be analyzed to determine the external context information.

In one implementation, the computing system 100 can obtain a conversation topic from the previous electronic messages. For example, the conversation topic could be meeting for dinner. The computing system 100 can identify dates/times across the whole conversation and resolve the dates and times relative to the time the message was sent. The computing system 100 can also identify open or unanswered questions from the previous electronic messages. For example, one of the more recent electronic messages could be "when are you coming?" or "when will you arrive?" The question can be identified as open if a response has not yet been provided. An estimated time of arrival for the first user 116 could be estimated using external context information, such as the type of activity and/or location information, and then utilized in responding to such a question, e.g., "on the bus, be there in 15 minutes." The suggestions could also be generated and/or filtered as the first user 116 enters text. For example, if the first user 116 types "I'm" in connection with a previous message "when will you arrive," then the suggestion could be "I'm on my way."

As mentioned above, the accelerometer 220 can be configured to measure a g-force being experienced by the client computing device 104. This information can then be used to detect a certain type of motion. Once example type of motion is the first user 116 is walking or running. While walking or running, the first user 116 may experience difficulty in typing at the client computing device 104 and thus the suggestions may be more detailed, e.g., a full sentence instead of a word or phrase. Other types of motion can be initiating or being in the process of a particular type of transportation, such as getting into a car, boarding public transportation (e.g., a bus or train), getting onto a bicycle, or entering an elevator. For example, it may be difficult for a user to type when they need to hold an object, such as a pole while standing on a train or subway car. Location information and movement information captured by the GPS receiver 224 can also be used to detect the type of motion. Other types of motion can include waiting in a line or queue, which can involve periodic slow movements separated by static or non-moving periods, but it still may be difficult for the users to type a full message due to the repeated interruption and/or fear of causing a backup of others behind them in line.

As mentioned above, location information for the client computing device 104 can be utilized to provide more detailed suggestions, such as in response to a change in user location. Known locations (e.g., previously/frequently visited locations), such as a workplace or home of the first user 116, could be leveraged to provide a related message, such as "just got home" or "just got to work." There could be even more detailed location information, such as indoor location information or indoor positioning, and thus a suggestion could be as detailed as "just arrived at my desk." Calendar information could be similarly leveraged to determine when the first user 116 has a scheduled event and, when the client computing device 104 arrives at the corresponding location, the suggested message could be "just arrived." Suggestions could also be provided based on the known current activity, which could again be determined from user history (previously/frequently visited locations), location information, and/or calendar/schedule information. For example, the location could be a grocery store, and the suggested message could be "just getting some groceries from the store." Their current activity could also be one where they would not want to continue communicating, such as while they are in a work meeting, which could be determined from their calendar information (e.g., activity description, start time, and end time). In this type of scenario, a suggested message could be "I'll contact you later."

The exact suggested messages can also be specific to the first user 116. More specifically, a user-specific language model can be generated and trained based on the activity by the first user 116 (e.g., by using machine learning techniques). These machine learning techniques can identify or recognize patterns associated with the user, such as often used words and phrases. These patterns can be leveraged to create the user-specific language model, which can then predict a most-likely message to suggest (e.g., a possible suggest message having a highest respective probability score). The term language model as used herein can refer to a probability distribution over a sequence of text (characters, word, phrases, etc.) that is derived from (or "trained" based on) training data. In some implementations, a language model can assign a probability to a piece of unknown text (character, word, phrase, etc.) based on external context information (previous messages, location information, etc.) and a corpus of training data upon which the language model is trained. This training data, for example, can be related to the first user 116.

By utilizing this user-specific language model, the suggestions should mimic the style/tone of the first user 116, which may make the suggested electronic messages more applicable for the first user 116 because the receiving user (e.g., the second user 124) may be more likely to believe that the first user 116 actually typed the message as opposed to just selecting one of a few pre-generated messages. Cross-user machine learning could also be performed, and a global or non-user-specific language model could be generated and trained (e.g., based on user feedback indicative of which suggestions are high quality suggestions). Learning could also be performed to associate certain types of activities with average statistics (e.g., grocery shopping takes an average user approximately 30 minutes), which could then be leveraged to provide even better suggestions (e.g., "I'm at the grocery store. I'll be done in 20 minutes!"). There can also be various sub-categories for certain activities/statistics. For example only, grocery shopping may take an average user approximately 20 minutes during the middle of a work day, such as at 11:00 am, whereas it may take an average user approximately 40 minutes in the evening of the work day, such as at 6:00 pm.

Figure 3:
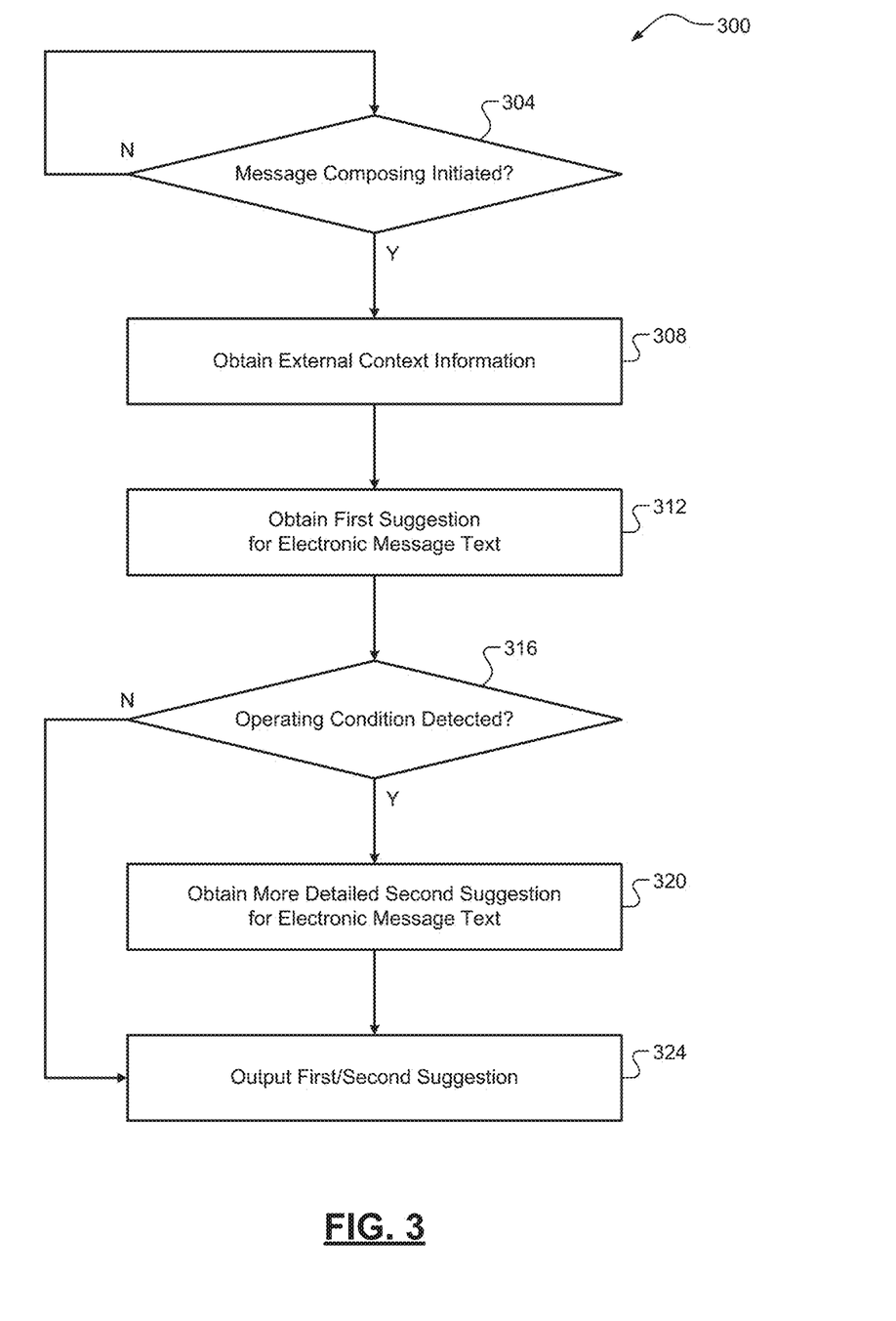
FIG. 3 is a flow diagram of an example method for suggesting electronic messages based on user activity and other context according to some implementations of the present disclosure.

Referring now to FIG. 3, an example method 300 for suggesting electronic messages based on user activity and other context is presented. At 304, the computing system 100 can detect whether composing an electronic message at the client computing device 104 has been initiated. This could be, for example, in response to the user selecting or clicking a text entry area or an input field in an electronic messaging application (see input field 404 in FIGS. 4A-4C). If true, the method 300 can proceed to 308. At 308, the computing system 100 can obtain contextual information for the electronic message from a source external to a text of the electronic message. At 312, the computing system 100 (e.g., the server computing device 108) can obtain a first suggestion for the text of the electronic message based on the external contextual information.

At 316, the computing system 100 can detect an operating condition indicative of a user activity during which the first user 116 is likely to experience difficulty in typing at the client computing device 104. When the operating condition is detected, the method 300 can proceed to 320. Otherwise, the method 300 can proceed to 324. At 320, the computing system 100 can obtain a second suggestion for the electronic message based on the contextual information, the second suggestion being more detailed than the first suggestion. At 324, the computing system 100 can output (e.g., from the server computing device 108 to the client computing device 104) either the first or second suggestion, depending on the decision at 316. The first user 116 could then utilize the provided suggestion in composing the electronic message, which can then be sent to the other computing device 120 via the network 112.

Figure 4A:
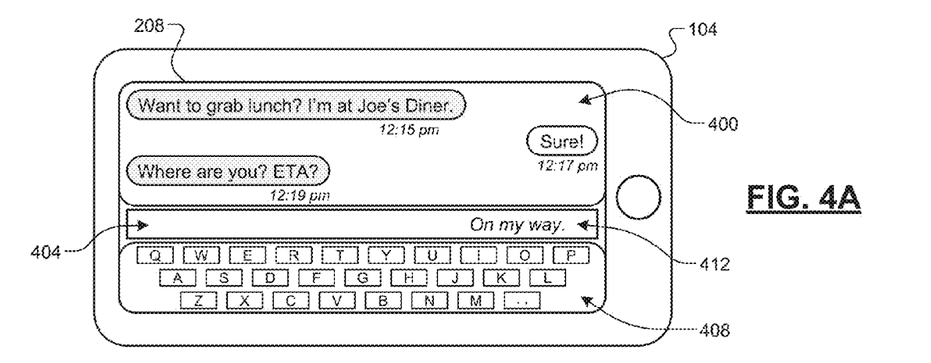
FIGS. 4A-4C are example user interfaces according to some implementations of the present disclosure.
Figure 4B:
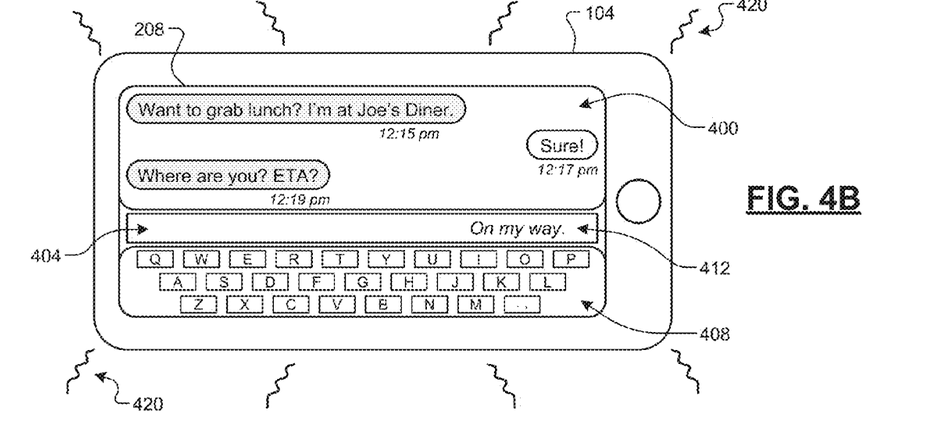
Figure 4C:
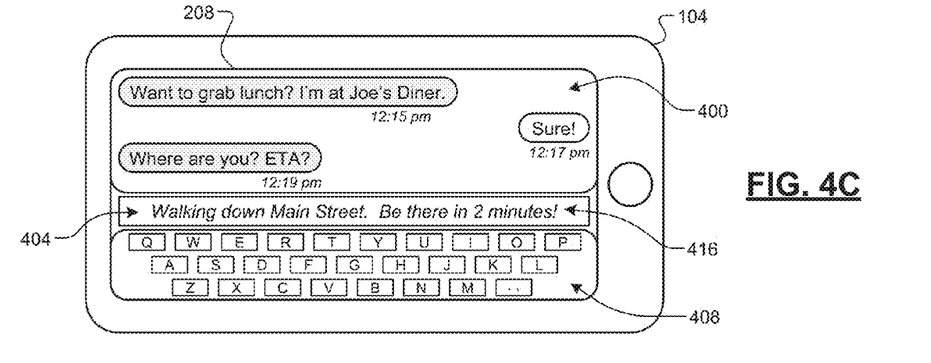

Referring now to FIGS. 4A-4C, example user interfaces according to some implementations of the present disclosure are illustrated. Specifically, three different user interfaces that are output via the user interface 208 (e.g., a touch display) of the client computing device 104 are illustrated. The user interfaces each include a message area 400, an input area 404, and a keyboard area 408. The keyboard displayed in the keyboard area 408 could be a physical keyboard, a virtual keyboard, or some combination thereof. As seen in FIG. 4A, a first suggestion 412 for a text of an electronic message ("On my way") has been suggested. This first suggestion 412 could be generated based on an external context of the electronic message, and could be generated/output without the first user 116 having input any text for the electronic message. Examples of this external context are the previous messages that are displayed in message area 400. As shown, another user (e.g., second user 124) sent the electronic message "Want to grab lunch? I'm at Joe's Diner." This electronic message was time stamped at 12:15 pm. In response, the first user 116 of the client computing device 104 sent the electronic message "Sure!" This electronic message was time stamped at 12:17 pm.

Some examples of the context that can be derived from these electronic messages are the type of activity (eating), the location ("Joe's Diner") and the confirmation ("Sure!"). These electronic messages are also proximate in time, as opposed to the first user 116 of the client computing device 104 responding "Sure!" at 6:00 pm, which would not be appropriate for still meeting for lunch. As shown, the other user (e.g., second user 124) has also sent another message at 12:19 pm ("Where are you? ETA?"). This provides further context for the first suggestion "On my way." That is, the other user has inquired where the first user 116 of the client computing device 104 is and when they will arrive. As previously discussed herein, the first suggestion 412 may be inadequate in certain scenarios. As shown in FIG. 4B, a g-force 420 (e.g., vibration) of the client computing device 104 could be detected using accelerometer 220, which can indicate that the first user 116 of the client computing device 104 is walking or running. In response to detecting such an operating condition or any of the other particular operating conditions discussed herein, a more detailed second suggestion for the text of the electronic message can be provided.

As shown in FIG. 4C, a more detailed second suggestion 416 has been provided. This second suggestion 416 is "Walking down Main Street. Be there in 2 minutes!" This second suggestion 416 is more detailed than the first suggestion 412 ("On my way.") in that it provides more information and/or more appropriately answers the other user's previous question ("Where are you? ETA?"). This second suggestion could also be generated based on the external context of the electronic message. Examples of this context include location information (e.g., GPS data from GPS receiver 224) for the client computing device 104, from which it can be determined that the first user 116 is walking down a particular street and is approximately two minutes from arriving at the destination ("Joe's Diner"). While the second suggestion 416 is shown as replacing the first suggestion 412, it will be appreciated that the first suggestion 412 may not be provided to the first user 116. In other words, the operating condition could be detected shortly after receiving the most recent electronic message ("Where are you? ETA?"), and the second suggestion 416 could thereafter be provided.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   detecting, by a computing device having one or more processors, an initiation of composing an electronic message by a user;
   obtaining, by the computing device, contextual information for the electronic message from a source external to a text of the electronic message, wherein the contextual information comprises:
one or more previous electronic messages associated with the user, and
device contextual information that includes at least one of: location information indicating a detected location of the computing device, or accelerometer information indicating detected motion of the computing device;
obtaining, by the computing device, a first suggestion for the text of the electronic message based on at least one of: the one or more previous electronic messages, or the device contextual information;
detecting an operating condition of the computing device based at least on the device contextual information;
determining, by the computing device, whether the operating condition is indicative of a first user activity that causes difficulty in providing user input to the computing device via typing;
in response to determining that the operating condition is indicative of the first user activity,
obtaining, by the computing device, a second suggestion for the text of the electronic message based on at least the device contextual information, the second suggestion including information corresponding to the first suggestion and including activity information relating to the first user activity, wherein the activity information is absent from the first suggestion; and
outputting, by the computing device, the second suggestion in a user interface; and
in response to determining that the operating condition is indicative of a second user activity that does not cause difficulty in providing user input to the computing device via typing, outputting, by the computing device, the first suggestion in the user interface.

2. The computer-implemented method of claim 1, wherein the first suggestion and the second suggestion are obtained using a user-specific language model that is trained based on training data comprising prior activity of the user.

3. The computer-implemented method of claim 1, wherein obtaining the contextual information comprises obtaining the location information, the method further comprising determining that a location of the computing device has changed, and wherein the second suggestion relates to the change in the location of the computing device.

4. The computer-implemented method of claim 1, wherein the first suggestion is based at least in part on the one or more previous electronic messages.

5. The computer-implemented method of claim 1, wherein the second suggestion includes an estimate of time for completing the first user activity determined based on previous occurrences of the first user activity.

6. The computer-implemented method of claim 1, wherein the second suggestion includes an estimate of a time of arrival of the user that is based on the device contextual information.

7. The computer-implemented method of claim 1, wherein the contextual information includes calendar information associated with the user, wherein the calendar information includes at least one of: a type of an activity the user is currently engaged in, or at least one of a start time and an end time of the activity that the user is currently engaged in.

8. The computer-implemented method of claim 1, wherein (i) the first suggestion is a word and the second suggestion is a phrase or a sentence or (ii) the first suggestion is the word or the phrase and the second suggestion is the sentence.

9. The computer-implemented method of claim 1, wherein the activity information includes a description of the first user activity and a description of the detected location of the computing device.

10. The computer-implemented method of claim 1, wherein the computing device is a client computing device associated with the user, and wherein obtaining the accelerometer information comprises measuring, by an accelerometer of the client computing device, a gravitational force experienced by the client computing device; and
wherein determining that the operating condition is indicative of the first user activity includes detecting a type of motion for the user based on the measured gravitational force, wherein the type of motion is walking or running.

11. The computer-implemented method of claim 1, wherein the computing device is a client computing device associated with the user, and wherein obtaining the accelerometer information comprises measuring, by an accelerometer of the client computing device, a gravitational force experienced by the client computing device; and
wherein determining that the operating condition is indicative of the first user activity includes detecting a type of motion for the user based on the measured gravitational force, wherein the type of motion indicates use of a type of transportation, the type of transportation including one of: car, public transportation vehicle, or elevator.

12. The computer-implemented method of claim 1, wherein the detecting of the operating condition is based on the accelerometer information indicating a measured gravitational force on the computing device.

13. The computer-implemented method of claim 12, wherein the first user activity is waiting in a line, and wherein the measured gravitational force indicates that the user is waiting in a line based on detected periodic slow movements of the computing device separated by periods of time during which the computing device does not move.

14. A computing device, comprising:
a non-transitory computer-readable medium having a set of instructions stored thereon; and
one or more processors configured to execute the set of instructions, which causes the one or more processors to perform operations comprising:
detecting an initiation of composing an electronic message by a user;
obtaining contextual information for the electronic message from a source external to a text of the electronic message, wherein the contextual information comprises:
one or more previous electronic messages associated with the user, and
device contextual information that includes at least one of: location information indicating a detected location of the computing device, or accelerometer information indicating detected motion of the computing device;
obtaining a first suggestion for the text of the electronic message based on at least one of: the one or more previous electronic messages, or the device contextual information;
detecting an operating condition of the computing device based at least on the device contextual information;

determining whether the operating condition is indicative of a first user activity that causes difficulty in providing user input to the computing device via typing;

in response to determining that the operating condition is indicative of the first user activity,
obtaining a second suggestion for the text of the electronic message based on at least the device contextual information, the second suggestion including information corresponding to the first suggestion and including activity information relating to the first user activity, wherein the activity information is absent from the first suggestion; and
outputting the second suggestion in a user interface; and in response to determining that the operating condition is indicative of a second user activity that does not cause difficulty in providing user input to the computing device via typing, outputting, by the computing device, the first suggestion in the user interface.

15. The computing device of claim 14, wherein the computing device is a client computing device of the user and further comprises an accelerometer, and wherein the operation of obtaining the accelerometer information comprises measuring, by the accelerometer, a gravitational force experienced by the client computing device upon detecting the initiation of composing the electronic message by the user,
wherein determining that the operating condition is indicative of the first user activity includes detecting a type of motion for the user based on the measured gravitational force, wherein the type of motion is one of: walking, running, or using a type of transportation, wherein the type of transportation includes one of: car, public transportation vehicle, or elevator.

16. The computing device of claim 14, wherein the detecting of the operating condition is based on the accelerometer information indicating a measured gravitational force on the computing device, wherein the first user activity is waiting in a line, and wherein the measured gravitational force indicates that the user is waiting in a line based on detected periodic slow movements of the computing device separated by periods of time during which the computing device does not move.

17. The computing device of claim 14, further comprising a global positioning satellite (GPS) receiver, and wherein obtaining the contextual information comprises obtaining the location information from the GPS receiver, the operations further comprising determining that a location of the computing device has changed, wherein the second suggestion relates to the change in the location of the computing device.

18. The computing device of claim 14, wherein the second suggestion includes an estimate of a time of arrival of the user that is based on the device contextual information.

19. The computing device of claim 14, wherein the contextual information includes calendar information associated with the user, wherein the calendar information includes at least one of: a type of an activity the user is currently engaged in, or at least one of a start time and an end time of the activity that the user is currently engaged in.

20. The computing device of claim 14, wherein (i) the first suggestion is a word and the second suggestion is a phrase or a sentence or (ii) the first suggestion is the word or the phrase and the second suggestion is the sentence.

21. The computing device of claim 14, wherein the activity information includes a description of the first user activity and a description of the detected location of the computing device.

22. The computing device of claim 14, wherein the first suggestion is based at least in part on the one or more previous electronic messages.

23. The computing device of claim 22, wherein the second suggestion includes an estimate of time for completing the first user activity determined based on previous occurrences of the first user activity.

24. The computing device of claim 14, wherein the first suggestion and the second suggestion are obtained using a user-specific language model that is trained based on training data comprising prior activity of the user.

25. The computing device of claim 24, wherein the first suggestion or the second suggestion mimic a style or a tone of the user.

26. A non-transitory computer readable medium storing processor-executable instructions thereon that when executed by a processor, cause the processor to perform operations comprising:
detecting, by a computing device having one or more processors, an initiation of composing an electronic message by a user;
obtaining, by the computing device, contextual information for the electronic message from a source external to a text of the electronic message, wherein the contextual information comprises:
one or more previous electronic messages associated with the user, and
device contextual information that includes at least one of: location information indicating a detected location of the computing device, or accelerometer information indicating detected motion of the computing device;
obtaining, by the computing device, a first suggestion for the text of the electronic message based on at least one of: the one or more previous electronic messages, or the device contextual information;
detecting an operating condition of the computing device based at least on the device contextual information;
determining, by the computing device, whether the operating condition is indicative of a first user activity that causes difficulty in providing user input to the computing device via typing;
in response to determining that the operating condition is indicative of the first user activity,
obtaining, by the computing device, a second suggestion for the text of the electronic message based on at least the device contextual information, the second suggestion including information corresponding to the first suggestion and including activity information relating to the first user activity, wherein the activity information is absent from the first suggestion; and
outputting, by the computing device, the second suggestion in a user interface; and
in response to determining that the operating condition is indicative of a second user activity that does not cause difficulty in providing user input to the computing device via typing, outputting, by the computing device, the first suggestion in the user interface.

* * * * *